United States Patent [19]
Hojo et al.

[11] Patent Number: 4,694,696
[45] Date of Patent: Sep. 22, 1987

[54] VIBRATION-TYPE GYRO APPARATUS

[75] Inventors: Takeshi Hojo; Shin-Ichi Kawada, both of Kuroiso; Michio Fukano, Ohtahara; Kanshi Yamamoto, Kuroiso; Youji Okamura, Nasumachi; Kazuteru Sato, Kuroiso; Masahiko Saito, Yokosuka; Fuyuki Hane, Nasumachi, all of Japan

[73] Assignee: Kabushikikaisha Tokyo Keiki, Tokyo, Japan

[21] Appl. No.: 790,527

[22] Filed: Oct. 23, 1985

[30] Foreign Application Priority Data

Oct. 25, 1984 [JP] Japan ................................. 59-224755
Oct. 25, 1984 [JP] Japan ................................. 59-224756
Oct. 25, 1984 [JP] Japan ................................. 59-224759
Oct. 25, 1984 [JP] Japan ................................. 59-224760

[51] Int. Cl.$^4$ .............................................. G01P 9/04
[52] U.S. Cl. ......................................... 73/497; 73/505
[58] Field of Search ................... 73/497, 505; 310/315, 310/329, 370; 331/156

[56] References Cited

U.S. PATENT DOCUMENTS 4,578,650 3/1986 Watson ................................. 73/505

FOREIGN PATENT DOCUMENTS 0161049 11/1985 European Pat. Off. .............. 73/505

Primary Examiner—John Chapman
Attorney, Agent, or Firm—Hill, Van Santen, Steadman & Simpson

[57] ABSTRACT

A vibration-type gyro apparatus is disclosed, which includes a vibration mass portion, a piezo-electric element for detecting the displacement of the apparatus and a preamplifier having an input resistance R and supplied with the output from the piezo-electric element, wherein the input resistance R is selected to have a value substantially expressed as $R \approx 1/C\omega$ (where C is an electrostatic capacity of the piezo-electric element and $\omega$ is a vibration angular velocity of the mass portion) so that the gyro apparatus will be substantially free of variations due to temperature changes.

3 Claims, 10 Drawing Figures

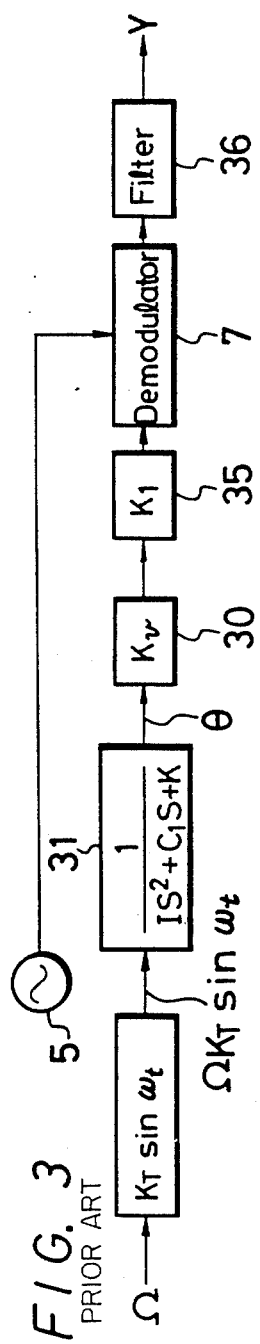
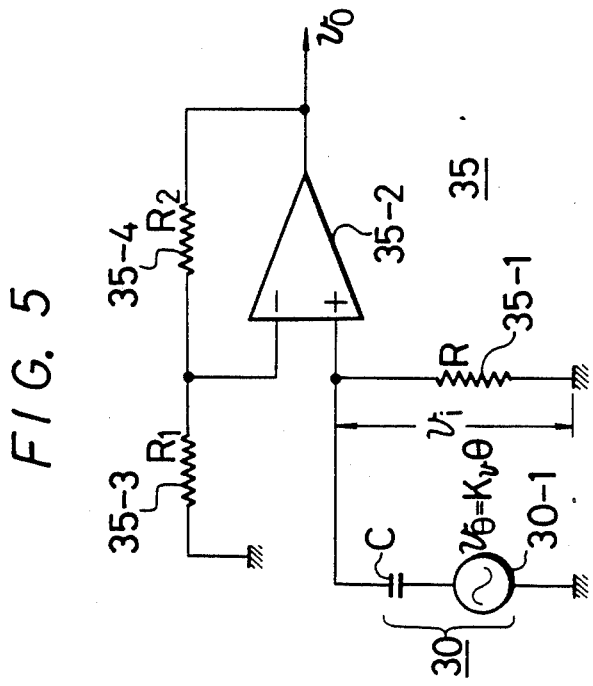
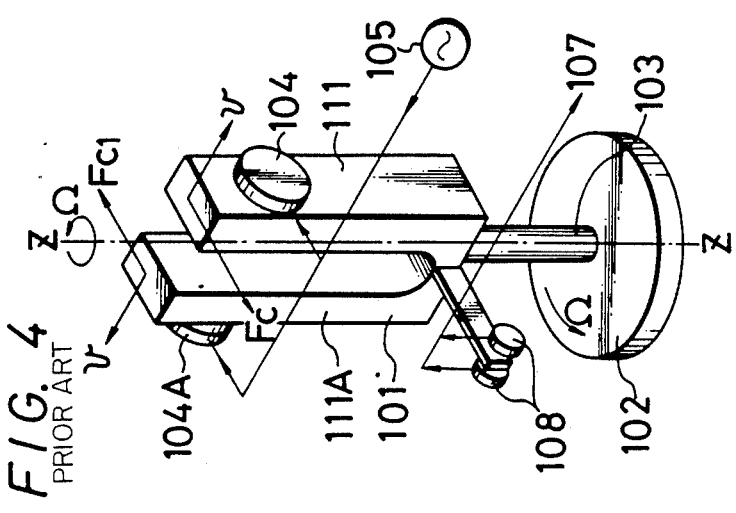

VIBRATION-TYPE GYRO APPARATUS

BACKGROUND OF THE INVENTION

1. Field of the Invention

This invention relates generally to a gyro apparatus and, more particularly, is directed to a vibration-type gyro apparatus using a vibrating mass portion.

2. Description of the Prior Art

A summary of a vibration-type gyro apparatus previously proposed (disclosed in Japanese patent application No. 58-45234) by the same assignee of the present application will be described with reference to FIGS. 1 and 2. FIG. 1 is a perspective view of such previously proposed vibration-type gyro apparatus and FIG. 2 is a side view thereof.

Referring initially to FIG. 1, this gyro apparatus has a base table 2 of a flat plate-shape on which a detection piezo-electric element 30 with a thin plate-shape made of a rectangular bimorph leaf is attached so as to be substantially perpendicular to the upper surface of the base table 2 so as to detect an input angular velocity $\Omega$. When the detection piezo-electric element 30 is attached on the base table 2, an attaching portion 30A may be used as required. Reference numeral 1 designates generally a tuning fork which consists of a pair of vibration mass portions 1-1 each having a large mass, a pair of flexible portions 1-2 respectively coupled to the vibration mass portions 1-1 and a base portion 1-3 for connecting the free ends of the both flexible portions 1-2 and 1-2. On the upper surface of the base portion 1-3, there is fixed an L-shaped attaching portion 1-4 such that one leg portion 1-4a thereof extends upward substantially in the vertical direction and that the other leg portion 1-4b thereof extends in the direction substantially parallel to the both flexible portions 1-2 and 1-2. A counter weight portion 1-5 is attached to the under surface of the base portion 1-3.

The tuning fork 1 formed as above is fixed to the vibration detection piezo-electric element 30 of thin plate-shape in the following manner. That is, the leg portion 1-4b of the L-shaped attaching portion 1-4 is fixed to the upper portion of the piezo-electric element 30 so that the width direction B of the piezo-electric element 30 of thin plate-shape is extended in the spacing or gap g between the both flexible portions 1-2 and 1-2 of the tuning fork 1. Consequently, as shown in FIG. 2 that is a side view of FIG. 1, the tuning fork 1 is attached to the piezo-electric element 30 such that the vibration plane (tuning fork surface) of the tuning fork 1 becomes substantially parallel to the plane of the base table 2 located horizontally, or the vibration plane thereof becomes perpendicular to the longitudinal central axis X-X of the piezo-electric element 30. In this case, the spacing or gap g between the flexible portions 1-2 and 1-2 is designed in such size and shape that even when the piezo-electric element 30 is vibrated to incline the vibration surface of the tuning fork 1, the piezo-electric element 30 and the both flexible portions 1-2, 1-2 can be prevented from contacting with one another. Further, the height of the piezo-electric element 30 on the base table 2 is determined so that the vibration mass portions 1-1 of the tuning fork 1 and the counter weight portion 1-5, etc. can be prevented from contacting with the upper surface of the base table 2 even when the vibration plane of the tuning fork 1 is inclined.

In FIG. 1, reference numerals 4, 4 designate drive piezo-electric elements that are respectively attached to the both flexible portions 1-2, 1-2. These drive piezo-electric elements 4, 4 are driven by, for example, a signal from an AC signal source 5, whereby to excite the vibration mass portions 1-1, 1-1 of the tuning fork 1 to alternately vibrate at a velocity, v.

If under this state the input angular velocity $\Omega$ is applied around a tuning fork axis indicated by Z-Z in FIG. 1, a Coriolis force Fc proportional to the product of the velocity v and the angular velocity $\Omega$ occurs at each of the two vibration mass portions 1-1 in the opposite directions to thereby alternately vibrate the tuning fork 1 around the above mentioned tuning fork axis Z-Z at the frequency same as that of the tuning fork 1. The displacement angle of this alternate vibration is converted to an electrical signal by the detection piezo-electric element 30 of bimorph-leaf type which is delivered as an output voltage.

In this case, when the output voltage from the detection piezo-electric element 30 is supplied to a demodulator 7 together with the signal from the AC signal source 5 as the reference voltage and is synchronously rectified, the demodulator 7 produces a voltage proportional to the angular velocity $\Omega$ applied around the tuning fork axis Z-Z of the tuning fork 1 perpendicular to the axis X-X, thus the vibration-type gyro apparatus being constructed.

FIG. 3 is a functional block diagram of the vibration-type gyro apparatus shown in FIGS. 1 and 2. Let us now assume that the product of the mass of the both vibration mass portions 1-1 of the tuning fork 1, the vibration amplitude and the vibration frequency, etc of the vibration mass portions 1-1 be expressed by a proportional constant $K_T$. Then, an alternate torque $\Omega K_T \sin \omega_t$ made by the Coriolis force Fc provided by multiplying the angular velocity $\Omega$ around the tuning fork axis Z-Z and the proportional constant $K_T$ urges the whole of the tuning fork 1 to alternately angular-vibrate around the tuning fork axis Z-Z. In FIG. 3, reference numeral 31 designates a mechanical system including the tuning fork 1 provided around the axis Z-Z and the expression within the block 31 represents the transfer function thereof. A displacement angle $\theta$ of the alternate angular vibration is converted to an electrical signal by the piezo-electric element 30 and amplified in AC by a pre-amplifier 35. Thereafter, it is supplied to the demodulator 7 and then synchronously rectified with the signal from the AC signal source 5. The output from the demodulator 7 is then fed to a filter 36. Thus, from the filter 36 there is produced a voltage Y proportional to the angular velocity $\Omega$. In FIG. 3, reference letter Kv designates a deviation angle-voltage conversion constant of the piezo-electric element 30 and $K_1$ designates the gain of the pre-amplifier 35. In the transfer function provided within the block 31, reference letter I denotes inertial efficiency of the tuning fork system around the tuning fork axis Z-Z, $C_1$ denotes an equivalent viscosity resistance coefficient of the tuning fork system, K denotes a torque spring constant of the piezo-electric element 30 around the tuning fork axis Z-Z and S denotes a Laplace operator, respectively.

However, such previously proposed vibration-type gyro apparatus is designed to detect the vibration amplitude of the tuning fork 1 by the piezo-electric element 30, and if the ambient temperature is changed, the output voltage is changed because the temperature sensitivity of the above piezo-electric element 30 is large with the result that the vibration-type gyro apparatus has high (poor) temperature sensitivity.

Another example of the prior art vibration-type gyro apparatus will be described with reference to FIG. 4. In this prior art vibration-type gyro apparatus of FIG. 4, a tuning fork 101 is supported on a base table 102 through a flexible shaft 103. The central line of the flexible shaft 103 is made coincident with the central line of both leg portions 111 and 111A of the tuning fork 101, so that this central line is referred to as an axis Z-Z hereinafter. Reference numerals 104 and 104A respectively designate drive apparatus which are adapted to vibrate the both leg portions 111 and 111A of the tuning fork 101. Various apparatus, such as an electrostriction element, an electromagnetic forcer and so on can be used as the drive apparatus 104 and 104A. When an AC drive voltage from an AC voltage source 105 is supplied to the drive apparatus 104 and 104A to vibrate the tuning fork 101, both leg portions 111 and 111A of the tuning fork 101 are vibrated symmetrically with respect to the axis Z-Z. Let us consider a certain moment. At this time, as shown in FIG. 4, if the tip ends of both leg portions 111 and 111A of the tuning fork 101 are being moved to the outside at a velocity, v and the whole of the vibration-type gyro apparatus is being constantly rotated together with the base table 102 around the axis Z-Z at an angular velocity $\Omega$, Coriolis force Fc occurs at one leg portion 111 of the tuning fork 101 and Coriolis force $F_{C1}$ in parallel to but opposite in direction to the former occurs in the other leg portion 111A so that the tuning fork 101 is urged to twist the flexible shaft 103 relative to the base table 102. This action is caused by the couple of force made of Coriolis forces $F_C$ and $F_{C1}$. Since the tuning fork 101 is vibrated, when the movements of the both leg portions 111 and 111A are oriented toward the inside opposite to the former state and the velocities v thereof are reversed in direction opposite to that shown in FIG. 4, the Coriolis forces $F_C$ and $F_{C1}$ are also reversed in direction so that the couple of force made by the Coriolis forces $F_C$ and $F_{C1}$ is reversed in direction. Therefore, if a constant angular velocity $\Omega$ exists around the axis Z-Z, the tuning fork 101 produces a twisting vibration around the axis Z-Z for the base table 102. In this case, the amplitude thereof is in proportion to the couple of force made by the Coriolis forces $F_C$ and $F_{C1}$ so that it becomes proportional to the angular velocity $\Omega$. Accordingly, if a twist detector 108 for detecting the twisting vibration of the tuning fork 101 around the axis Z-Z is provided at the base portion of the tuning fork 101 as shown in FIG. 4 and an output 107 therefrom is detected, the angular velocity $\Omega$ can be known. Thus, the vibration-type gyro apparatus of FIG. 4 can be used equivalently to a rate gyro as the detector for detecting the angular velocity $\Omega$ around the axis Z-Z.

As shown in FIG. 4, the prior art normal exciting method for the tuning fork 101 comprises a structure in which the AC voltage of a constant frequency and a constant voltage is applied to the drive apparatus 104 and 104A of the tuning fork 101. If it is not required to vibrate the tuning fork 101 at its dynamical resonant frequency, this method is simple and to the point. However, if the resonant frequency of the tuning fork 101 is not used, it is very difficult to produce a large amplitude, and a power efficiency thereof is not so good. For this reason, it is strongly suggested to vibrate the tuning fork 101 at its resonant frequency in use. To this end, a power source frequency is made coincident with the dynamical resonant frequency of the tuning fork and the power source is adjusted so as to produce a voltage which can provide a necessary amplitude.

However, this method has a serious defect. That is, since the dynamical resonant frequency of this kind of dynamic system is extremely sharp and the resonant frequency changes because it is sensitive to temperature, even if a satisfactory resonant state is established at a certain time, the dynamical resonant frequency is gradually displaced from a constant electrical frequency due to the change of the ambient temperature and so on. As a result, the amplitude rapidly decreases and the characteristic of the vibration-type gyro apparatus is suddenly deteriorated. Therefore, the prior art vibration-type gyro apparatus has defects that the vibration thereof is easily affected by the ambient temperature and the like, the amplitude thereof is greatly changed and the sensitivity thereof is not constant. Further, the power source for producing a constant frequency and a constant voltage is not so cheap. Accordingly, if the accuracy of the vibration-type gyro apparatus is increased, an expensive power source has to be used. In this case, however, in spite of the expensive power source, the prior art vibration-type gyro apparatus can not increase satisfactorily the efficiency as is required by the vibration-type gyro apparatus because of the above mentioned defects.

Furthermore, the above dynamical resonant frequency is changed a little with the change of ambient temperature or the like. In this case, only if the amplitude of the vibration of the tuning fork 101 is held constant, the velocity v of the leg portions 111, 111A of the tuning fork 101 would not be made constant (the velocity v of the tuning fork 101 is as given by the product of vibration amplitude and vibration frequency). This becomes a scale factor error when the gyro apparatus is used as the vibration-type gyro apparatus.

OBJECTS AND SUMMARY OF THE INVENTION

Accordingly, it is an object of this invention to provide a vibration-type gyro apparatus in which a dynamical vibration system can be vibrated at an inherent frequency and with a predetermined amplitude continuously regardless of external disturbances, such as a change of temperature, so that the above mentioned shortcomings inherent in the prior art vibration-type gyro apparatus can be removed.

Another object of this invention is to provide a vibration-type gyro apparatus capable of operating accurately and which can be simplified in construction and made at low cost.

Still another object of this invention is to provide a vibration-type gyro apparatus of high precision which is free of errors caused by temperature characteristics of electrostatic capacity and electromechanical coupling coefficient of a piezo-electric element.

Further object of this invention is to provide a vibration-type gyro apparatus which can be applied to various types of gyro apparatus using a normal tuning fork or the vibration of rod and plate.

Still further object of this invention is to provide a vibration-type gyro apparatus which can be effectively applied to a case in which a temperature characteristic becomes a serious problem when a displacement detector such as a piezo-electric element is used as a pick-up element for the vibration.

Still further object of this invention is to provide a vibration-type gyro apparatus in which an angular vibration signal applied from an angular vibration detector to a demodulator and a reference voltage always keep a correct dynamical phase relationship therebetween so that the vibration-type gyro apparatus can produce an output stably and can operate with high precision.

Still further object of this invention is to provide a vibration-type gyro apparatus which can be similarly applied to a gyro apparatus whose drive system of the tuning fork is a desired one, such as a self-excited system or a separate-excited system.

Still further object of this invention is to provide a vibration-type gyro apparatus which can be applied to a control loop in which a vibration amplitude of a dynamical vibration system such as a tuning fork is made constant.

Still further object of this invention is to provide a vibration-type gyro apparatus which can be applied to a control loop in which a vibration angular velocity amplitude of a tuning fork is made constant.

Yet further object of this invention is to provide a vibration-type gyro apparatus which can be used to control the vibration of a dither apparatus of a laser gyro.

According to one aspect of the present invention, there is provided a vibration-type gyro apparatus comprising:

a vibration mass portion;

a piezo-electric element for detecting a displacement; and a pre-amplifier having an input resistance R and supplied with an output from said piezo-electric element, wherein said input resistance R is selected to be a value substantially expressed as $R \approx 1/C\omega$ (where C is an electrostatic capacity of said piezo-electric element and $\omega$ is a vibration angular velocity of said mass portion).

According to another aspect of the present invention, there is provided a vibration-type gyro apparatus comprising:

a vibration system having a resonant point of an inherent frequency;

a drive apparatus for vibrating said vibration system;

a displacement detector formed of a piezo-electric element for detecting a vibration of said vibration system;

a pre-amplifier having an input resistance R and supplied with an output from said piezo-electric element; and a control apparatus for controlling said vibration system so as to continuously vibrate stably, wherein said input resistance R of said control apparatus is selected to be a value substantially expressed as $R \approx 1/C\omega$ (where C is an electrostatic capacity of said piezo-electric element and $\omega$ is an angular frequency of said vibration system).

According to further aspect of the present invention, there is provided a vibration-type gyro apparatus comprising:

a vibrating tuning fork-type vibrator having at least a pair of leg portions;

a drive apparatus for continuously vibrating said vibrator;

an apparatus for detecting an angular vibration of said vibrator around an input axis passing through the center of said vibrator and in parallel to said leg portions of said vibrator;

a demodulator for synchronously rectifying an output from said detecting apparatus for detecting said angular vibration; and a vibration detecting apparatus for producing an output corresponding to a tuning vibration of said vibrator, an output from said vibration detecting apparatus being used as a reference voltage for said demodulator.

These and other objects, features and advantages of the present invention will become apparent from the following detailed description of the preferred embodiments taken in conjunction with the accompanying drawings, throughout which like reference numerals designate like elements and parts.

BRIEF DESCRIPTION OF THE DRAWINGS

FIG. 3 is a block diagram of the vibration-type gyro apparatus shown in FIGS. 1 and 2;

FIG. 4 is a perspective view illustrating a prior art vibration-type gyro apparatus;

FIG. 5 is a circuit diagram showing a main part of an embodiment of a vibration-type gyro apparatus according to the present invention;

DESCRIPTION OF THE PREFERRED EMBODIMENTS

Figure 1:
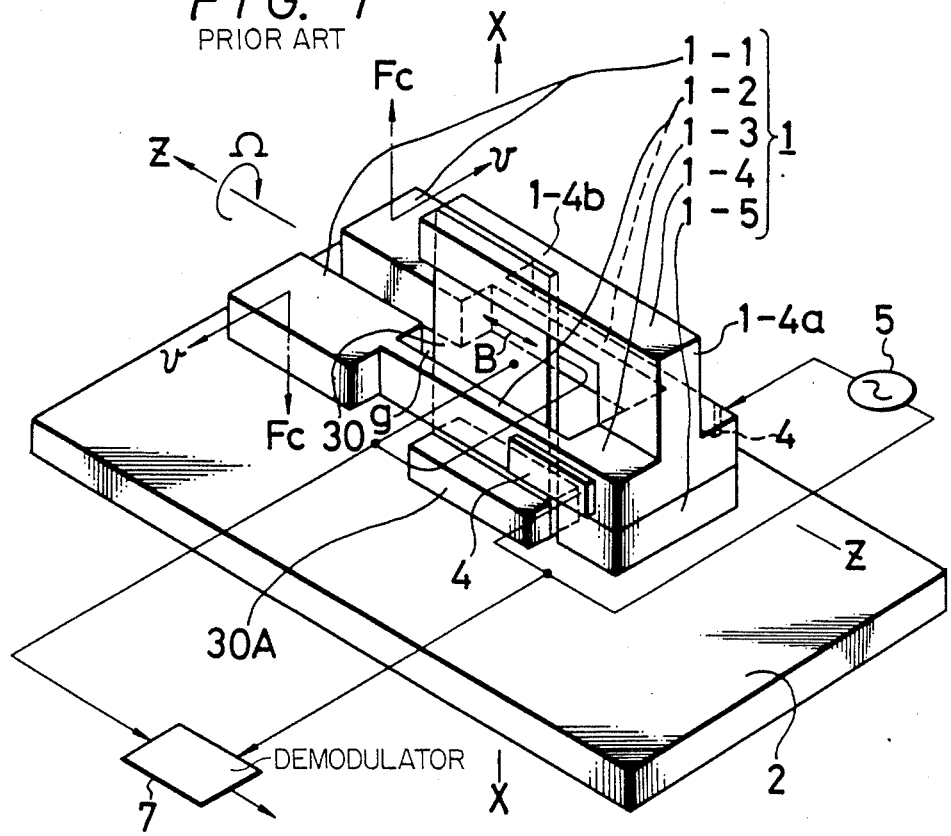
FIG. 1 is a perspective view of a previously proposed vibration-type gyro apparatus.
Figure 2:
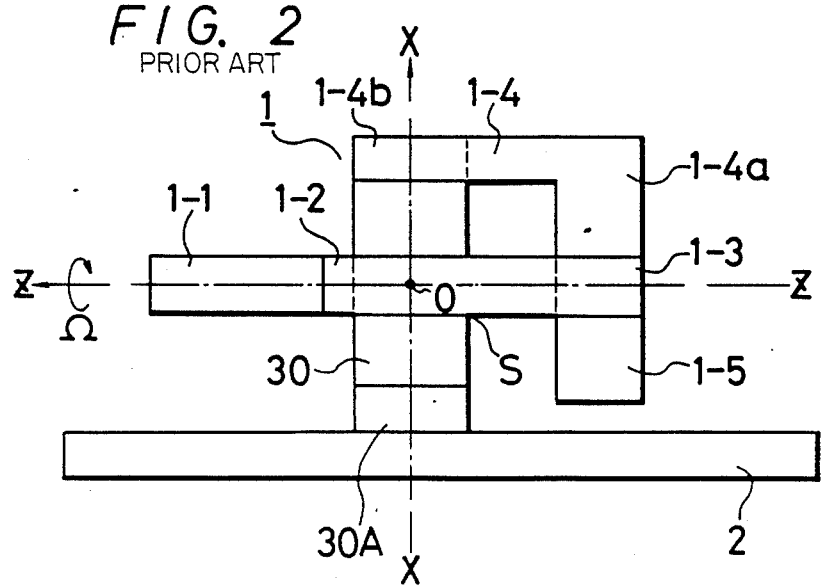
FIG. 2 is a side view thereof.

Now, the present invention will hereinafter be described with reference to the attached drawings.

FIG. 5 is a circuit diagram showing a main part of a first embodiment of the vibration-type gyro apparatus according to the present invention. More specifically, FIG. 5 diagrammatically illustrates the portions of the pre-amplifier 35 and the piezo-electric element 30 similar to those shown in FIG. 3. In FIG. 5, nearly like parts corresponding to those of FIG. 3 are marked with the same references and will not be described in detail.

Referring to FIG. 5, when the piezo-electric element 30 is used in the vibration-type gyro apparatus of this invention, it is operated at a sufficiently low frequency as compared with a self-resonant frequency so that it is approximately formed of a voltage source 30-1 having a voltage $V_\theta = K_v \theta$ proportional to the displacement angle $\theta$ and an electrostatic capacity C. While, the pre-amplifier 35 is formed of an input resistor 35-1 with a resistance R, an operational amplifier 35-2 and feedback resistors 35-3 and 35-4 having resistances $R_1$ and $R_2$. Between an input voltage Vi to the operational amplifier 35-2 and the output voltage $V_\theta$ of the piezo-electric element 30, there is established a relationship that is expressed by the following Eq. (1).

$$Vi = \{RCS/(RCS+1)\}V_\theta \quad (1)$$

To substitute Eq. (2)

$$V_\theta = Kv\bar{\theta}\sin\omega_t \quad (2)$$

(where $\bar{\theta}$ is a vibration amplitude, $\omega$ is an angular frequency of tuning fork) to Eq. (1) yields the following Eq. (3)

$$Vi = Kv\bar{\theta}\frac{RC\omega}{\sqrt{R^2C^2\omega^2 + 1}}\sin(\omega_t + \phi) \quad (3)$$

where $\phi$ is the phase angle determined by R, C and so on.

If a ratio (gain) between the amplitude and the vibration amplitude of the input voltage Vi is taken as $\bar{S}$, the following Eq. (4) is established.

$$\bar{S} = \frac{|Vi|}{\bar{\theta}} = \frac{KvRC\omega}{\sqrt{R^2C^2\omega^2 + 1}} \quad (4)$$

On the other hand, $K_v$ of the piezo-electric element is expressed by the following Eq. (5)

$$Kv = \hat{K}k/\sqrt{C} \quad (5)$$

where $\hat{K}$ is the constant determined by the size of the piezo-electric element 30 and k is an electrochemical coupling coefficient of the piezo-electric element 30.

To substitute Eq. (5) to Eq. (4) yields the following Eq. (6)

$$\bar{S} = \frac{\hat{K}kR\sqrt{C}\,\omega}{\sqrt{R^2C^2\omega^2 + 1}} \quad (6)$$

Since the electrostatic capacity C and the electromechanical coupling coefficient k are large in temperature sensitivity as compared with other constants in Eq. (6), if the temperature characteristic equation of the gain $\bar{S}$ is made, the following Eq. (7) is established $$\left(\frac{d\bar{S}}{dT}\right)/\bar{S} = \frac{-R^2C^2\omega^2 + 1}{2(R^2C^2\omega^2 + 1)}\cdot\frac{1}{C}\left(\frac{dC}{dT}\right) + \frac{1}{k}\left(\frac{dk}{dT}\right) \quad (7)$$

If $$A = \frac{1}{k}\left(\frac{dk}{dT}\right)$$

expresses the temperature coefficient of the electromechanical coupling coefficient and $$B = \frac{1}{C}\left(\frac{dC}{dT}\right)$$

expresses the temperature coefficient of the electrostatic capacity C, Eq. (7) becomes the following Eq. (8)

$$\left(\frac{d\bar{S}}{dT}\right)/\bar{S} = A + \frac{-R^2C^2\omega^2 + 1}{2(R^2C^2\omega^2 + 1)}B \quad (8)$$

If Eq. (8) is taken as zero and the condition having no temperature sensitivity is searched for, the input resistance R at that time is expressed by the following Eq. (9)

$$R = \sqrt{\frac{B + 2A}{B - 2A}} \times \frac{1}{C\omega} \quad (9)$$

Generally, since B>A, Eq. (9) is approximately given as $$R \approx 1/C\omega \quad (10)$$

In general, the temperature characteristic B of the electrostatic capacity C of the piezo-electric element 30 is in the order of $10^{-3}/°C$. Accordingly, if the change of temperature is taken as 100° C., the gain fluctuation larger than 10% is presented so that a large restriction is exerted upon the property of the vibration-type gyro apparatus.

According to the embodiment of the present invention shown in FIG. 5, by selecting the input resistance R to the pre-amplifier 35 supplied with the output from the piezo-electric element 30 to be the value given by Eq. (9) or (10), it is possible to obtain a vibration-type gyro apparatus of high precision which can remove the errors caused by the temperature characteristics of the electrostatic capacity C and the electromechanical coupling coefficient k of the piezo-electric element 30.

While in FIG. 5 the present invention is applied to the vibration-type gyro apparatus of FIG. 1, it is needless to say that the vibration-type gyro apparatus of this invention can be applied to gyro apparatus of various types including a normal one using a tuning fork or utilizing the vibration of rod or plate. In short, this invention can be applied to all cases in which the temperature characteristic becomes a serious problem when the piezo-electric element 30 is used as the pick-up element for vibration.

Figure 6:
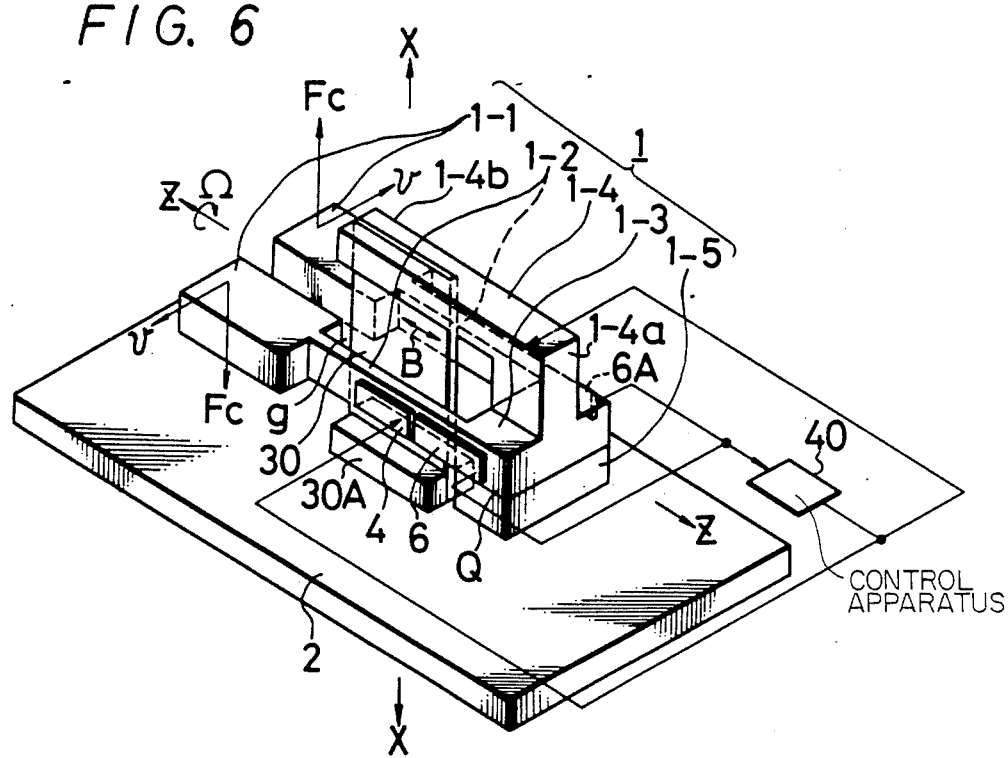
FIG. 6 is a perspective view illustrating another embodiment of the vibration-type gyro apparatus according to the present invention.

FIG. 6 is a perspective view illustrating another embodiment of the gyro apparatus (vibration-type gyro apparatus) according to the present invention. This vibration-type gyro apparatus corresponds to the example of the previously proposed gyro apparatus of FIG. 1. Hence, in FIG. 6, like parts corresponding to those of FIG. 1 are marked with the same references and will not be described in detail.

In the embodiment of FIG. 6, in order to detect the displacement of the tuning fork 1, the outputs from the displacement detectors (piezo-electric elements) 6, 6A attached to the both flexible portions 1-2 of the tuning fork 1 are respectively supplied through a control apparatus 40 of this embodiment to the drive elements 4, 4 (one of them is not shown in the figure) attached to the two flexible portions 1-2 of the tuning fork 1, whereby one control closed loop is constructed.

In the tuning fork 1 of the vibration-type gyro apparatus, if the right and left leg portions (each being formed of the vibration mass portion 1-1 and the flexible portion 1-2) thereof are symmetrically equal to each other, an equivalent moment of inertia seen from the vibration supporting point Q of one leg portion is taken as I and a restoring spring constant is taken as k, a dynamical equation of moment of the vibration-type gyro apparatus becomes as follows for each leg portion where S is the Laplace operator.

$$(IS^2 + k)\phi = KV \quad (11)$$

where $\phi$ is the bending angle (displacement angle) of one leg of the tuning fork 1, V is the voltage to be applied to the pair of drive elements 4, K is the gain constant of the drive elements 4 and KV is the torque produced by the drive element 4.

From Eq. (11), a transfer function between the torque V and the displacement angle $\phi$ is given as by the following Eq. (12)

$$\frac{\phi}{V} = \frac{(K/I)}{S^2 + k/I} \quad (12)$$

As described above, these Eqs. (11) and (12) are made without regarding an air resistance against the tuning fork 1 and the energy loss caused by the distortion within the leg portion. Although these Eqs. (11) and (12) may be sufficient as the first approximation, there is the above energy loss in practice. Accordingly, if this energy loss is represented by the existence of the damping torque substantially proportional to the vibration angular velocity, Eq. (12) is presented by the following Eq. (13)

$$\frac{\phi}{V} = \frac{(K/I)}{S^2 + D/IS + k/I} \quad (13)$$

where D is the coefficient of the damping item.

Figure 7:
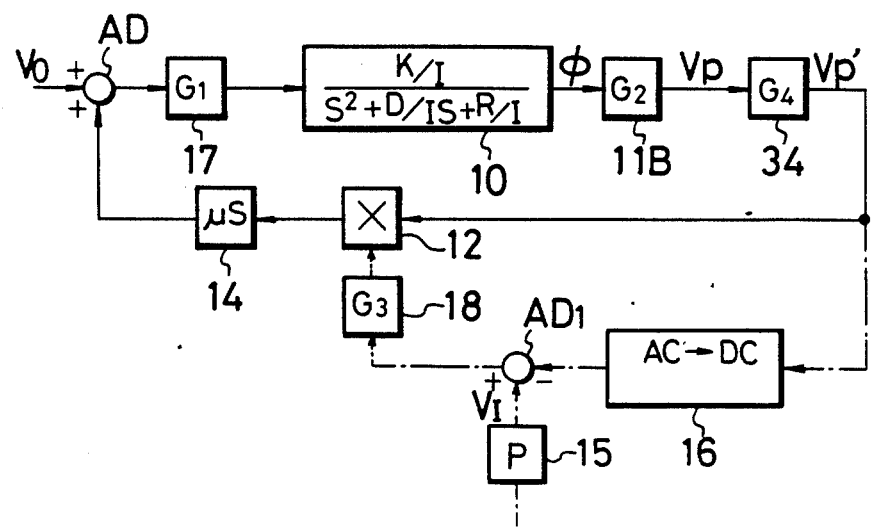
FIG. 7 is a block diagrm of the vibration-type gyro apparatus of the invention shown in FIG. 6.

FIG. 7 is a block diagram showing the control apparatus 40 used in the vibration-type gyro apparatus of FIG. 6. In FIG. 6, reference numeral 10 designates a dynamic system, or an object to be controlled (vibration-type gyro apparatus) and the equation within the block denotes the transfer function thereof. Reference numeral 11B designates the whole of the displacement detectors 6 and 6A and $G_2$ in the block 11B designates the gain thereof. $V_P$ designates an output voltage from the above mentioned displacement detector 6 and 6A. This voltage $V_P$ is applied through a pre-amplifier 34 and a multiplier 12 to a control circuit 14. The control circuit 14 is adapted to carry out mainly the differentiation operation and the differentiation coefficient thereof is presented as $\mu$. The output from the control circuit 14 is supplied to an adder AD and thereby added to an initial voltage $V_O$. The output from the adder AD is amplified by an amplifier 17 and then applied to the drive elements 4 of the dynamical vibration system 10, thus the control loop being closed.

The multiplier 12 shown in FIG. 7 has two input signals. If these two input signals are respectively taken as X and Y and the output signal from the multiplier 12 is taken as Z, a relationship among the input and output signals is generally given as by Z=XY/Vc where Vc is the constant to be determined by the multiplier 12. In this case, if the above equation is rewritten into Z/X=Y/Vc and an output voltage $V_{P'}$ from the pre-amplifier 34 is taken as one input signal X of the multiplier 12, the gain for the output voltage $V_{P'}$ of the pre-amplifier 34 is changed with the value of the other input signal Y. For example, when the value of the other input signal Y is equal to the constant Vc of the multiplier 12, the gain of the multiplier 12 is 1 and hence it produces the output $V_{P'}$.

Referring to FIG. 7, an explanation will be given to a case in which the gain of the multiplier 12 is 1. In this case, the output voltage $V_{P'}$ from the pre-amplifier 34 is directly fed to the control circuit 14. Accordingly, if the output voltage $V_{P'}$ is calculated from the example of FIG. 7, the output voltage $V_{P'}$ is given as by the following Eq. (14).

$$V_{P'} = \frac{G_1G_2G_4(K/I)}{S^2 + \{D/I - G_1G_2G_4(K/I)\mu\}S + k/I} V_0 \quad (14)$$

Eq. (14) indicates that the output voltage $V_{P'}$ becomes the vibration solution having the amplitude corresponding to the initial voltage $V_0$. More specifically, this means that if the right-hand side of Eq. (14) is $D/I < G_1G_2G_4(K/I)\mu$, the vibration is diverged; if it is $D/I > G_1G_2G_4(K/I)\mu$, the vibration is converged; and if it is $D/I = G_1G_2G_4(K/I)\mu$, a constant amplitude can be obtained.

Subsequently, a loop shown by a one-dot chain line in FIG. 7 will be described. The output voltage $V_{P'}$ is applied to an AC→DC conversion section 16, too. The AC→DC conversion section 16 is adapted to fully rectify the input voltage $V_{P'}$ thereto and to produce a DC voltage corresponding to the amplitude of the input voltage $V_{P'}$ by a proper smoothing circuit (not shown). The DC voltage of $V_{P'}$ therefrom is supplied to and compared with a predetermined voltage $V_I$, which is a reference voltage supplied from an element 15 such as a potentiometer, by an adder AD1. The difference signal therefrom is applied to a difference amplifier 18. The difference amplifier 18 is adapted to amplify the difference signal supplied thereto and to supply its output signal to the multiplier 12.

When the gyro apparatus of FIG. 7 is actuated, it is not yet started to vibrate so that the output $V_{P'}$ from the pre-amplifier 34 is started from zero. Thus, the output from the AC→DC conversion section 16 is zero. Accordingly, the difference amplifier 18 produces an output, $G_3 V_I$. If the gain $G_3$ of the difference amplifier 18 is selected large properly, the condition of $G_3 V_I > V_c$ is satisfied and hence the output voltage from the difference amplifier 18 becomes larger than the constant Vc of the multiplier 12. Therefore, since the multiplier 12 is started from the state of the gain more than 1, if the differential coefficient $\mu$ of the control circuit 14 is selected so as to satisfy the condition of $D/I < G_1G_2G_4(K/I)\mu$, the closed loop of one cycle shown in FIG. 7 is diverged, the vibration in the form of a sinusoidal wave with an angular frequency of $\omega = \sqrt{k/I}$ is generated and the amplitude thereof is gradually increased. Since this indicates that the signal of one cycle of the loop is increased under being vibrated, the tuning fork 1 is also dynamically vibrated at such frequency and the amplitude thereof is also increased. As a result, since the input voltage $V_{P'}$ to the AC→DC conversion section 16 is increased, too, the difference between the predetermined voltage $V_I$ and the output voltage from the AC→DC conversion section 16 is gradually decreased so that the output voltge applied from the difference amplifier 18 to the multiplier 12 is decreased, too. For this reason, the gain of the multiplier 12 is gradually decreased by the influence of the decrease of the output voltage from the difference amplifier 18 in accordance with the increase of the output voltage $V_P'$. Accordingly, if an equivalent coefficient $\mu$, which results from multiplying the gain of the multiplier 12 and the differential coefficient $\mu$ of the control circuit 14, is presented as $\mu'$, $\mu'$ is maximum when the gyro apparatus is actuated and is rapidly decreased as the output voltage $V_P'$ is increased. Consequently, when $\mu'$ is used instead of $\mu$, the condition, $D/I < G_1 G_2 G_4 (K/I) \mu'$ is not maintained for so long. Whereas, as the $\mu'$ in the right-hand side of the condition is lowered, the condition of $D/I = G_1 G_2 G_4 (K/I) \mu'$ is satisfied soon, whereby the signal in the once cycle of the loop and the amplitude of the tuning fork 1 become constant. If at the periphery of this point the amplitude is increased by the external disturbance, the $\mu'$ is decreased more so that the condition of $D/I > G_1 G_2 G_4 (K/I) \mu'$ is established. Thus, the vibration is changed to the attenuation vibration and the amplitude thereof is controlled to be the original constant amplitude. While, if due to the external disturbance the amplitude is decreased and the output voltage $V_P'$ is decreased, $\mu'$ is increased so that the amplitude is increased. Hence the amplitude is controlled to become the original constant amplitude. As described above, it can be understood that the control loop of FIG. 7 has not only an automatic control function to make the amplitude constant but also the function to keep the frequency at the resonant frequency of the dynamical vibration system correctly. If the $\mu$ is determined once, the constant amplitude is determined by the predetermined voltage $V_I$ and the gain of the difference amplifier 18. In this case, if the transfer function of the difference amplifier 18 is given a characteristic (for example, "proportion+integration" characteristic) where the gain is increased as the frequency is lowered, the normal value of the amplitude is determined only by the predetermined voltage $V_I$. Therefore, it is possible to freely determine the amplitude by changing the contact voltage $V_I$ by the element 15.

Figure 8:
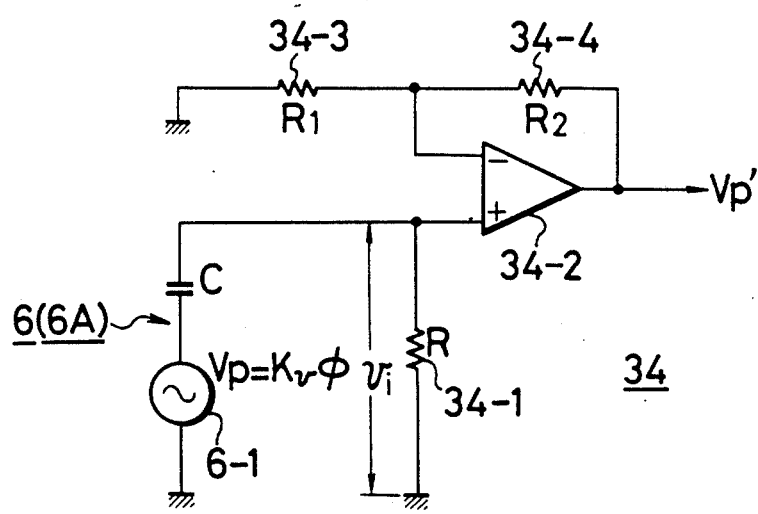
FIG. 8 is a circuit diagram showing a pre-amplifier and portions of piezo-electric elements of a control apparatus used in the vibration-type gyro apparatus of FIG. 7.

FIG. 8 is a circuit diagram showing portions of the pre-amplifier 34 and the displacement detectors 6, 6A of the control circuit 40 shown in FIG. 6. For example, when the displacement detectors 6, 6A formed of the piezo-electric element are used in the control apparatus of this invention, the displacement detectors 6, 6A are operated at a very low frequency as compared with their self-resonant frequency so that they are approximately formed of a voltage source 6-1 having a voltage $V_P = K v \phi$ proportional to the displacement angle $\phi$ of each tuning fork 1 and an electrostatic capacity C. While, the pre-amplifier 34 is formed of an input resistor 34-1 of resistance R, and operational amplifier 34-2 and feedback resistors 34-3 and 34-4 having resistances $R_1$ and $R_2$. Between the input voltage Vi to the operational amplifier 34-2 and the output voltage $V_P$ of the piezo-electric eements 6, 6A there is established a relationship that is expressed by the following Eq. (15).

$$Vi = \{RCS/(RCS+1)\}V_P \quad (15)$$

where S is the Laplace operator. In this case, the voltage $V_P$ can be expressed by the following equation (16)

$$V_P = Kv\bar{\phi} \sin \omega_t \quad (16)$$

(where $\bar{\phi}$; vibration amplitude, $\omega$; angular frequency of tuning fork).

If this equation (16) is substituted for Eq. (15) and then converted to the time region, the following Eq. (17) is obtained.

$$Vi = Kv\bar{\phi} \frac{RC\omega}{\sqrt{R^2C^2\omega^2 + 1}} \sin(\omega_t + \phi) \quad (17)$$

where $\phi$ is the phase angle determined by R, C and so on.

If a ratio (gain) between the amplifier of the input voltage Vi and the vibration amplitude is taken as $\bar{S}'$ $\bar{S}$ is expressed by the following Eq. (18).

$$\bar{S} = \frac{|Vi|}{\bar{\phi}} = \frac{KvRC\omega}{\sqrt{R^2C^2\omega^2 + 1}} \quad (18)$$

On the other hand, the gain $\check{K}v$ of the piezo-electric elements 6, 6A is expressed by the following Eq. (19)

$$Kv = \check{K}\bar{k}/\sqrt{C} \quad (19)$$

where $\check{K}$ is the constant determined by the size of the piezo-electric elements 6, 6A and $\bar{k}$ is the electromechanical coupling coefficient of the piezo-electric elements 6, 6A.

To substitute Eq. (19) for Eq. (18) yields the following Eq. (20)

$$\bar{S} = \frac{\check{K}\bar{k}R\sqrt{C}\,\omega}{\sqrt{R^2C^2\omega^2 + 1}} \quad (20)$$

If now, in Eq. (20), the temperature characteristic equations of the gain $\bar{S}$ are given to the electrostatic capacity C and the electromechanical coupling coefficient $\bar{k}$ because they are large in temperature sensitivity as compared with other constants, the following Eq. (21) is established $$\left(\frac{d\bar{S}}{dT}\right)\bar{S} = \frac{-R^2C^2\omega^2 + 1}{2(R^2C^2\omega^2 + 1)} \cdot \frac{1}{C}\left(\frac{dC}{dT}\right) + \frac{1}{\bar{k}}\left(\frac{d\bar{k}}{dT}\right) \quad (21)$$

If $$A = \frac{1}{\bar{k}}\left(\frac{d\bar{k}}{dT}\right)$$

expresses the temperature coefficient of the electromechanical coupling coefficient k and $$B = \frac{1}{C}\left(\frac{d\bar{k}}{dT}\right)$$

expresses the temperature coefficient of the electrostatic capacity C, Eq. (21) is given as by the following Eq. (22)

$$\left(\frac{d\bar{S}}{dT}\right)\bar{S} = A + \frac{-R^2C^2\omega^2 + 1}{2(R^2C^2\omega^2 + 1)} B \quad (22)$$

If Eq. (22) is taken as zero and the condition having no temperature sensitivity is searched for, the input resistance R at that time is expressed by the following Eq. (23)

$$R = \sqrt{\frac{B + 2A}{B - 2A}} \times \frac{1}{C\omega} \quad (23)$$

Generally, since B>A, Eq. (23) is approximately given as $$R \approx 1/C\omega \quad (24)$$

While in the above the present invention is applied to the vibration-type gyro apparatus constructed as shown in FIG. 1, the control apparatus of this embodiment can be applied to a standard or normal gyro apparatus using a tuning fork or a gyro apparatus utilizing the vibration of a rod or plate. In short, this invention is very effective for removing the problem of the temperature characteristic where the displacement detector such as the piezo-electric element is used as the pick-up element for the vibration.

While in the above the present invention is applied to the control loop in which the vibration amplitude of the dynamical vibration system such as the tuning fork is made constant, it is needless to say that the present invention can be applied to a control loop in which the vibration angular velocity amplitude of the tuning fork is made constant. Furthermore, the present invention can be used to control the vibration of the dither apparatus of a laser gyro.

In general, the temperature characteristic B of the electrostatic capacity C of the displacement detectors 6, 6A is in the order of $10^{-3}/°C$. Accordingly, if the change of temperature is taken as 100° C., the gain is fluctuated more than 10% so that a large restriction is exerted upon the property of the vibration-type gyro apparatus.

According to the embodiment of the present invention shown in FIGS. 6 to 8, by selecting the input resistance R of the pre-amplifier 34 supplied with the outputs from the displacement detectors 6, 6A to be the value given by Eq. (23) or (24), it is possible to obtain the control apparatus for the vibration-type gyro apparatus of high precision which can remove the errors caused by the temperature characteristics of the electrostatic capacity C and the electromechanical coupling coefficient $\bar{k}$ of the displacement detectors 6, 6A.

Figure 9:
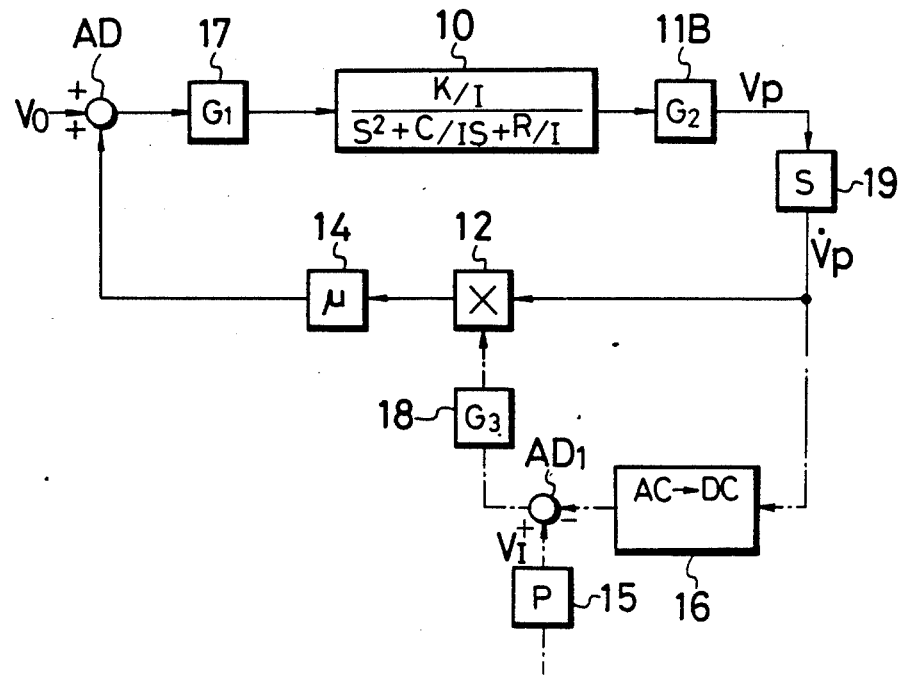
FIG. 9 is a block diagram showing a modified example of the vibration-type gyro apparatus shown in FIG. 7.

FIG. 9 is a functional block diagram showing a modified embodiment of FIG. 7. In FIG. 9, like parts corresponding to those of FIG. 7 are marked with the same references and will not be described in detail.

In the embodiment of the present invention shown in FIG. 9, the output voltages $V_p$ from the displacement detectors 6, 6A are supplied through a differentiator 19 and the multiplier 12 to the control circuit 14. The differentiator 19 and the control circuit 14 are adapted to mainly perform the differentiation operation, in which the differentiation coefficient thereof is presented as $\mu$. Reference letter $\dot{V}_p$ designates the output voltage from the differentiator 19 and the $\dot{V}_p$ indicates the time differentiation of the output $V_p$. The output from the control circuit 14 is supplied to the adder AD and thereby added to the initial voltage $V_0$ of a step waveform. The output from the adder AD is amplified by the amplifier 17 and then applied to the drive elements 4 of the dynamical vibration system 10, thus the control loop being closed.

The multiplier 12 shown in FIG. 9 has two input signals. If these two input signals are respectively taken as X and Y and the output signal from the multiplier 12 is taken as Z, a relationship among the input and output signals is generally given as by Z=XY/Vc where Vc is the constant to be determined by the multiplier 12. In this case, if the above equation is rewritten into Z/X=Y/Vc and an output voltage $\dot{V}_p$ from the differentiator 19 is taken as one input signal X, the gain of the multiplier 12 for the voltage $\dot{V}_p$ is changed with the value of the other input signal Y. For example, when the value of the other input signal Y is equal to the constant Vc of the multiplier 12, the gain of the multiplier 12 is 1 and it produces the output $\dot{V}_p$.

Referring to FIG. 9, an explanation will be given to a case in which the gain of the multiplier 12 is 1. In this case, the output voltage $\dot{V}_p$ is directly fed to the control circuit 14. Accordingly, if the output voltage $\dot{V}_p$ is calculated from the example of FIG. 9, the output voltaged $\dot{V}_p$ is given as by the following Eq. (25).

$$\dot{V}_p = \frac{G_1 G_2 (K/I) S}{S^2 + \{C/I - G_1 G_2 (K/I)\mu\} S + k/I} V_0 \quad (25)$$

Eq. (25) indicates that the output voltage $\dot{V}_p$ becomes the vibration solution having the angular velocity amplitude corresponding to the initial voltage $V_0$. More specifically, this means that if the right-hand side of Eq. (25) is $C/I < G_1 G_2(K/I)\mu$, the vibration is diverged; if it is $C/I = G_1 G_2(K/I)\mu$, the vibration is converged; and if it is $C/I = G_1 G_2(K/I)\mu$, a constant angular velocity amplitude can be obtained.

Subsequently, a loop shown by a one-dot chain line in FIG. 9 will be described. The output voltage $\dot{V}_p$ is applied to the AC→DC conversion section 16, too. The AC→DC conversion section 16 is adapted to fully rectify the input voltage $\dot{V}_p$ and to produce a DC voltage corresponding to the amplitude of the input voltage $\dot{V}_p$ by a proper smoothing circuit (not shown). The DC voltage of $\dot{V}_p$ is supplied to and compared with the predetermed voltage $V_I$, which is a reference voltage supplied from the determing element 15 such as a potentiometer, by the adder AD1. The difference signal therefrom is applied to the difference amplifier 18. The difference amplifier 18 is adapted to amplify the difference signal supplied thereto and to supply its output signal to the multiplier 12.

When the vibration-type gyro apparatus of FIG. 9 is actuated, it is not yet started to vibrate so that the output $\dot{V}_p$ is started from zero. Thus, the output from the AC→DC conversion section 16 is zero. Accordingly, the difference amplifier 18 produces an output, $G_3 V_I$. If the gain $G_3$ of the difference amplifier 18 is properly selected to be large, the condition of $G_3 V_I > Vc$ is satisfied and hence the output voltage from the difference amplifier 18 becomes larger than the constant Vc of the multiplier 12. Therefore, since the multiplier 12 is started from the state of the gain more than 1, if the proportion coefficient $\mu$ of the control circuit 14 is selected so as to satisfy the condition of $C/I < G_1 G_2(K/I)\mu$, the closed loop of one cycle shown in FIG. 9 is diverged, the vibration in the form of a sinusoidal wave at an angular frequency of $\omega \approx \sqrt{k/I}$ is generated and the angular velocity amplitude thereof is gradually increased. Since this indicates that the signal of one cycle of the loop is increased under being vibrated, the tuning fork 1 is dynamically vibrated at such frequency and the angular velocity amplitude thereof is also increased. As a result, since the input voltage $\dot{V}_p$ to the AC→DC conversion section 16 is increased, too, the difference between the predetermined voltage $V_I$ and the output voltage from the AC→DC conversion section 16 is gradually decreased so that the output voltage from the difference amplifier 18 applied to the multiplier 12 is decreased, too. For this reason, the gain of the multiplier 12 is gradually decreased by the influence of the decrease of the output voltage from the difference amplifier 18 in accordance with the increase of the output voltage $\dot{V}_p$. Accordingly, an equivalent coefficient $\mu$, which results from multiplying the gain of the multiplier 12 and the proportion coefficient $\mu$ of the control circuit 14, is presented as $\mu'$, $\mu'$ is maximum when the gyro apparatus is actuated and is rapidly decreased as the output voltage $\dot{V}_p$ is increased. Consequently, when $\mu'$ is used instead of $\mu$, the condition, $C/I < G_1G_2(-K/I)\mu'$ is not maintained for so long. Whereas, as the $\mu'$ in the right-hand side of the condition is lowered, the $C/I = G_1G_2(K/I)\mu'$ is satisfied soon, whereby the signal in the one cycle of the loop and the angular velocity amplitude of the tuning fork 1 become constant. If at the periphery of this point the angular velocity amplitude is increased by the external disturbance, the $\mu'$ is decreased more so that the condition of $C/I > G_1G_2(-K/I)\mu'$ is satisfied. Thus, the vibration is changed to the attenuation vibration and the angular velocity amplitude thereof is controlled to be the original constant angular velocity amplitude. While, if due to the external disturbance the angular velocity amplitude is decreased once and the output voltage $\dot{V}_p$ is decreased, the $\mu'$ is increased so that the vibration is increased and hence the angular velocity amplitude is controlled to become the original constant angular velocity amplitude. As described above, it can be understood that the control loop of FIG. 9 has not only an automatic control function to make the angular velocity amplitude constant but also the function to keep the frequency at the resonant frequency of the dynamical vibration system correctly. If the $\mu$ is determined once, the constant angular velocity amplitude is determined by the predetermined voltage $V_I$ and the gain $G_3$ of the difference amplifier 18. In this case, if the transfer function of the differene amplifier 18 is given a characteristic (for example, "proportion+integration" characteristic) where the gain is increased as the frequency is lowered, the normal value of the angular velocity amplitude is determined only by the predetermined voltage $V_I$. Therefore, it is possible to determine the angular velocity amplitude freely by changing the voltage $V_I$ by the element 15.

As set forth above, according to the embodiment of FIG. 9, since the dynamical vibration system such as the vibration-type gyro is vibrated at the inherent frequency thereof and the angular velocity amplitude thereof can be always kept constant, it is possible to remove all the defects inherent in the prior art gyro apparatus. In other words, the vibration-type gyro apparatus of this embodiment can remove the problem of unstable angular velocity amplitude caused by the change of temperature and can avoid the problem of the expensive voltage source for providing the constant frequency and the constant voltage by using the simple full-wave rectifying circuit and the multiplier. Thus, the present invention can provide a vibration-type gyro apparatus which can operate with high precision at low cost.

Figure 10:
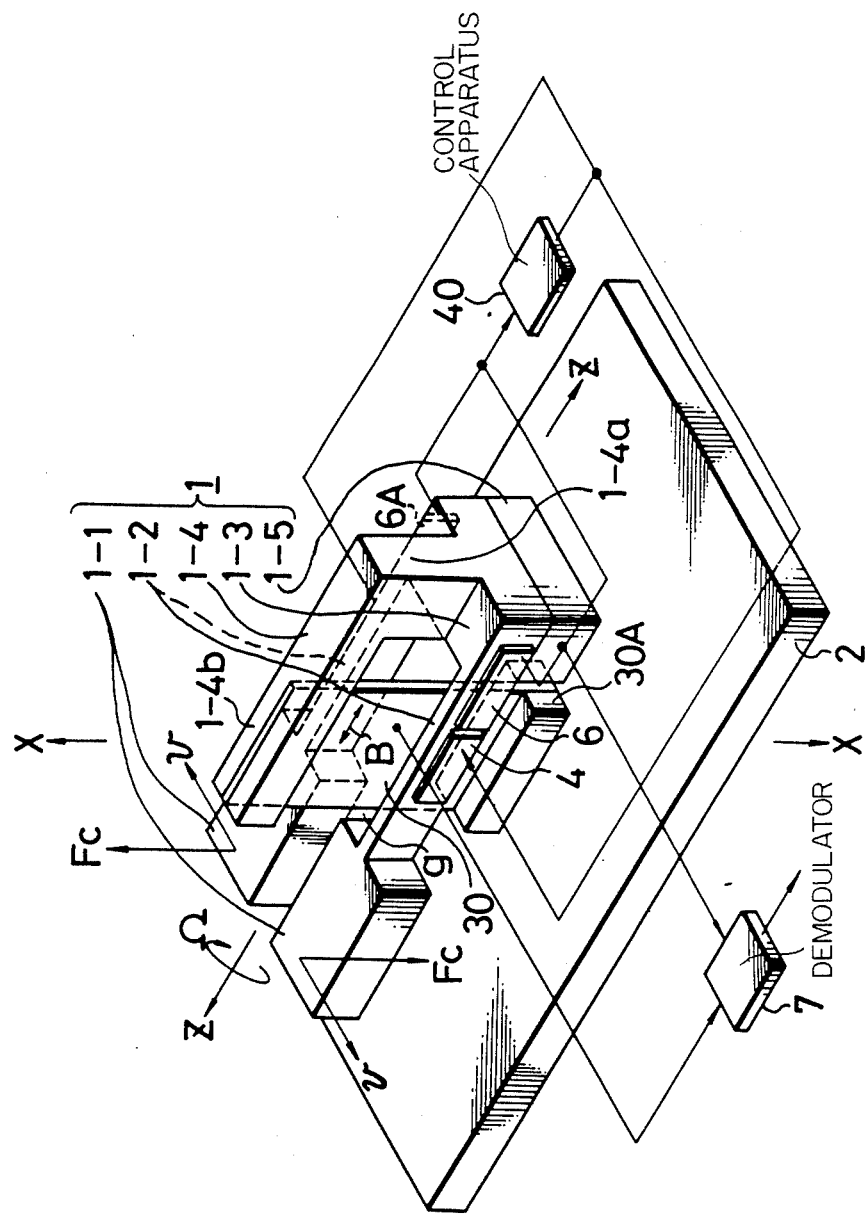
FIG. 10 is a perspective view illustrating a further embodiment of the vibration-type gyro apparatus according to the present invention.

FIG. 10 is a perspective view illustrating a further embodiment of the vibration-type gyro apparatus according to the present invention. In FIG. 10, like parts corresponding to those of FIG. 6 are marked with the same references and will not be described in detail.

In the embodiment of FIG. 10, the outputs from the displacement or vibration detectors 6, 6A of the tuning fork 1 are respectively supplied through the control circuit 40 to the drive elements 4 (one of them is not shown) made of, for example, piezo-electric element attached to the two flexible portions 1-2 of the tuning fork 1, whereby the vibration amplitudes of the vibration mass portions 1-1 of the tuning fork 1 are made constant.

On the other hand, the output from the vibration detectors 6, 6A is used as the reference phase of the demodulator 7. In this demodulator 7, it is synchronously rectified with the output from the piezo-electric element 30 of bimorph leaf type used as the angular vibration detector 30 so that the demodulator 7 produces the angular velocity output.

As set forth above, according to this embodiment of the present invention shown in FIG. 10, there are obtained the following merits: Since the angular vibration signal from the angular vibration detector 30 to the demodulator 7 and the reference signal thereof can always keep a correct dynamical phase relationship therebetween, it is possible to obtain the vibration-type gyro apparatus capable of producing a stable output and which can be operated with high precision; and since the drive voltage source 5 for the tuning fork 1 is not used as the reference voltage source for the demodulator 7, the tuning fork 1 can be driven by any drive system. In other words, the tuning fork 1 can similarly be driven as both self-excited type and separate-excited type. This is very effective for enabling the vibration-type gyro apparatus to operate with high precision.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. A vibration-type gyro apparatus comprising: a vibrating tuning fork-type vibrator having at least a vibration mass portion and a pair of leg portions; a drive apparatus for continuously vibrating said vibrator; a displacement detector formed of a first piezo-electric element for detecting a vibration of said vibrator; a first pre-amplifier having a first input resistance R1 and supplied with an output from said first piezo-electric element; a control apparatus connected to said first pre-amplifier for controlling said drive apparatus so as to continuously and stably vibrate said vibrator; a second piezo-electric element for detecting an angular vibration of said vibrator around an input axis passing through the center of said vibrator and in parallel to said leg portions of said vibrator; a second pre-amplifier having a second input resistance R2 and supplied with an output from said second piezo-electric element; and a demodulator for synchronously rectifying an output from said second piezo-electric element with respect to the output from said first piezoelectric element; wherein said input resistance R1 of first pre-amplifier is selected to be a value substantially expressed as $R1 \approx 1/C1\omega$ where C1 is an electrostatic capacitance of said first piezo-electric element and $\omega$ is an angular frequency of said vibrator, and said second input resistance R2 is selected to be a value substantially expressed as $R2 \approx 1/C2\omega$ where C2 is an electrostatic capacity of said second piezo-electric element.

2. A vibration-type gyro apparatus according to claim 1, in which said control apparatus produces a signal corresponding to a differentiated value of the output signal from said displacement detector and changes said signal corresponding to said differentiated value in response to a difference between said corresponding signal and a predetermined voltage, whereby said vibrator is vibrated at a frequency of said tuning fork-type vibrator and with a constant amplitude.

3. A vibration-type gyro apparatus as claimed in claim 1, wherein an output from said control apparatus is used as a reference voltage for said demodulator.

* * * * *